United States Patent
Cooperman et al.

(10) Patent No.: US 6,445,712 B1
(45) Date of Patent: Sep. 3, 2002

(54) BROADBAND ARCHITECTURE USING EXISTING TWISTED PAIR

(75) Inventors: Michael Cooperman, Framingham, MA (US); Craig Armiento, Acton, MA (US)

(73) Assignee: Verizon Laboratories Inc., Waltham, MA (US)

( * ) Notice: Subject to any disclaimer, the term of this patent is extended or adjusted under 35 U.S.C. 154(b) by 0 days.

(21) Appl. No.: 09/330,427

(22) Filed: Jun. 8, 1999

(51) Int. Cl.⁷ .............................................. H04L 12/28
(52) U.S. Cl. ...................... 370/420; 370/463
(58) Field of Search ................. 370/419, 430, 370/421, 463, 230

(56) References Cited

U.S. PATENT DOCUMENTS

| | | | |
|---|---|---|---|
| 4,583,219 A | * 4/1986 | Riddle | 370/230 |
| 4,663,748 A | 5/1987 | Karbowiak et al. | 370/89 |
| 4,794,589 A | 12/1988 | Finch et al. | 370/60 |
| 5,375,124 A | 12/1994 | D'Ambrogio et al. | 370/110.1 |
| 5,422,949 A | 6/1995 | Tsukagoshi | 379/399 |
| 5,519,700 A | 5/1996 | Punj | 370/60.1 |
| 5,828,666 A | 10/1998 | Focsaneanu et al. | 370/389 |
| 5,959,996 A | 9/1999 | Byers | 370/401 |

* cited by examiner

Primary Examiner—Salvatore Cangialosi
(74) Attorney, Agent, or Firm—Leonard Charles Suchyta; James K. Weixel (57) ABSTRACT

Provided herein are methods and systems for providing wide bandwidth using the present twisted pair telephone network. The methods and systems increase the bandwidth of ADSL by statistically sharing the bandwidth of many twisted pair in the neighborhood. An active subscriber would communicate over several twisted pair in the neighborhood, thereby obtaining a dramatic increase in bandwidth.

36 Claims, 5 Drawing Sheets

BROADBAND ARCHITECTURE USING EXISTING TWISTED PAIR

DESCRIPTION OF THE RELATED ART

1. Field of the Invention

This invention relates to the field of telecommunications, and more particularly to the field of providing increased bandwidth in telephone networks.

2. Background of the Invention

The development of computer technology has permitted a dramatic increase in the capability to store and manipulate information. The advent of computer networks, such as the Internet, has permitted a similarly dramatic increase in the ability of geographically distributed users to share such information. The number of persons and applications that rely on network computing continues to increase significantly each year, representing a large contributor to economic growth in the United States and elsewhere.

Figure 1:
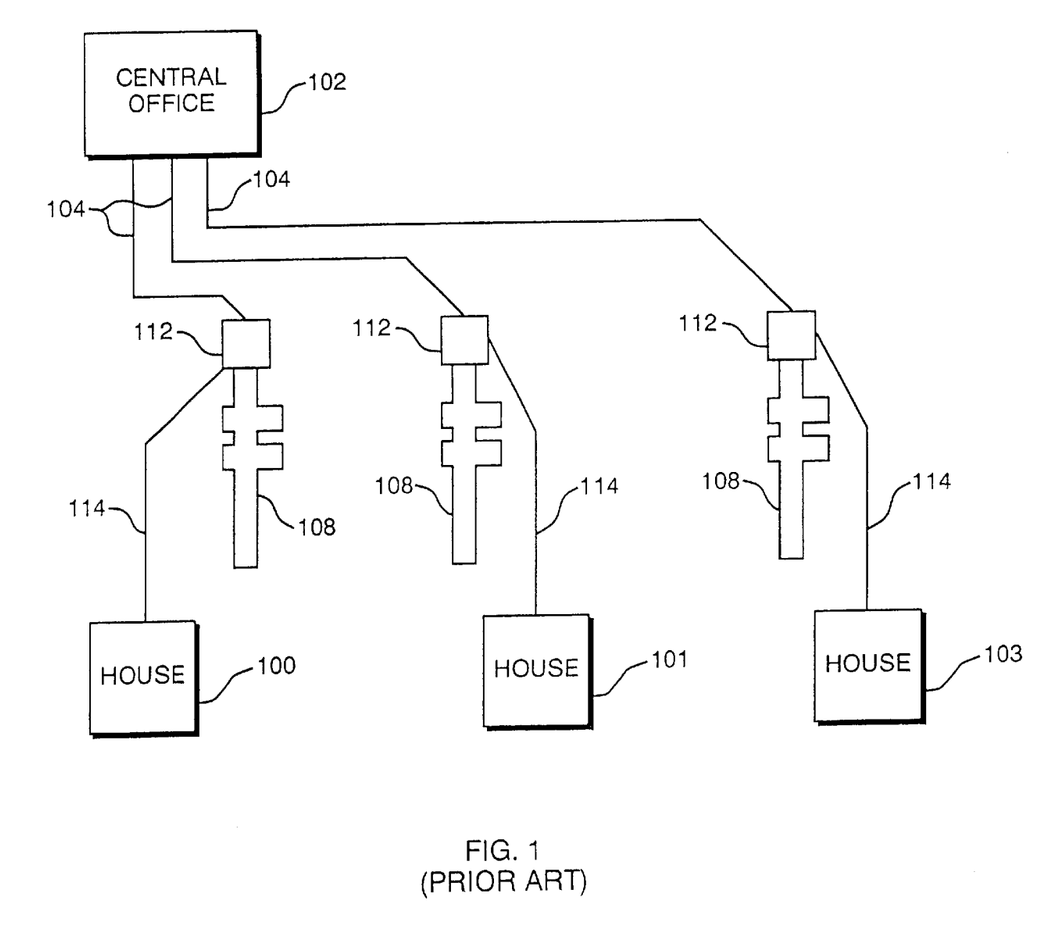
FIG. 1 depicts the wiring of the present telephone network.

One of the most significant limitations to network computing applications is the rate at which data can be transferred over networks, typically referred to as "bandwidth." The largest original network is the conventional telephone network, which consists of twisted pairs of copper wires linked between central offices and remote users. An example of a portion of a conventional telephone network is depicted in FIG. 1. Although computers are able, via modems and similar technology, to use conventional telephone networks, such networks are subject to a number of limitations. Among other things, telephone networks were originally intended for analog voice telephony. As digital applications using increasing amounts of data are required, telephone networks may provide inadequate bandwidth for such applications.

Many efforts have been undertaken to increase bandwidth in computer networks. Telecommunications providers have built networks using new technologies such as fiber optics. Cable television providers have sought to provide computing capabilities using networks of coaxial cable. Dedicated copper pairs, such as Ti lines, have been installed to provide increased bandwidth between certain sites. Systems such as ISDN have been established to provide increased bandwidth for certain applications. Protocols and methodologies such as Asymmetric Digital Subscriber Line ("ADSL") and Very-high-speed Digital Subscriber Line ("VDSL") technologies have been established to make more effective use of the existing telephone network and other networks, permitting, for example, bandwidth to be extended to the megabit per second range over conventional telephone networks.

None of these efforts represents a complete solution. Dedicated lines and new networks will require years of installation. ADSL and VDSL are only effective to a degree in increasing communication speed without further changes to networks. ISDN is limited and difficult to use. Cable networks do not reach all users. Accordingly, a need continues to exist for systems and methods that improve bandwidth delivery to users and take advantage of the existing telephone networks.

SUMMARY OF THE INVENTION

Systems and methods are provided herein for increasing bandwidth using existing twisted pair telephone networks. In particular, systems and methods are provided for permitting statistical sharing of bandwidth of many twisted pair wires in a given neighborhood.

Systems and methods are provided wherein an active subscriber would communicate over several twisted pair wires in the neighborhood, thereby obtaining a dramatic increase in bandwidth.

In an embodiment, systems and methods described herein could permit an increase in the distance capability of ADSL/VDSL technology.

Disclosed herein is a method for sending and receiving broadband data over twisted pair wire lines between a central office and a remote subscriber, including providing twisted pair wire lines from a remote location to a location proximal to a subscriber, providing a plurality of packet switch nodes at the location proximal to the subscriber and networking the packet switch nodes with the twisted pair wire lines from the remote location.

A packet switch node is provided that is capable of identifying packets addressed to a particular subscriber and sending packets to the particular subscriber. The packet switch node may include a modem, such as an ADSL or VDSL modem. The packet switch node may include one or more splitters, a packet switch, and a modulator. It should be understood that the term "packet switch node," as used herein, encompasses a variety of such nodes and is not limited to a mere packet switch.

Methods and systems disclosed herein may further include a neighborhood node at a remote location from the subscriber that is connected between the telecommunications line from the central office and the twisted pair lines that lead to the packet switch nodes. The neighborhood node may be connected to the central office by an optical fiber. The neighborhood node may be particularly useful for VDSL transmissions. The neighborhood node may be capable of converting incoming information from the central office into packets and capable of addressing each packet to a selected subscriber.

Provided herein is a telecommunications network, including a plurality of twisted pair lines, a neighborhood node between the central office and the subscriber capable of converting incoming information from the central office into packets and capable of addressing each packet to a selected subscriber, a plurality of packet switch nodes for identifying packets addressed to a particular subscriber and for sending packets to the particular subscriber, each of the packet switch nodes having a splitter for separating voice data from other data, a network connection between the neighborhood node and the packet switch node, the network connection using at least one of ADSL and VDSL technology for transmission of data packets and a connection between the packet switch nodes. The packet switch nodes may have a connection to a subscriber's house, such as via a drop wire.

DETAILED DESCRIPTION

The wiring of the present telephone network is shown in FIG. 1, using an example of three houses. Each house 100, 101, 103 is connected directly to a central office ("CO") 102 with wires 104, which in an embodiment is a twisted pair wire, that is carried on telephone poles 108 to a neighborhood. Twisted pair connectors 112 are mounted on telephone poles 108 to connect drop wires 114 to the houses 100, 101, 103. Each house 100, 101, 103 has a dedicated drop line 114 that can only be used by the house to which it is connected.

Figure 2:
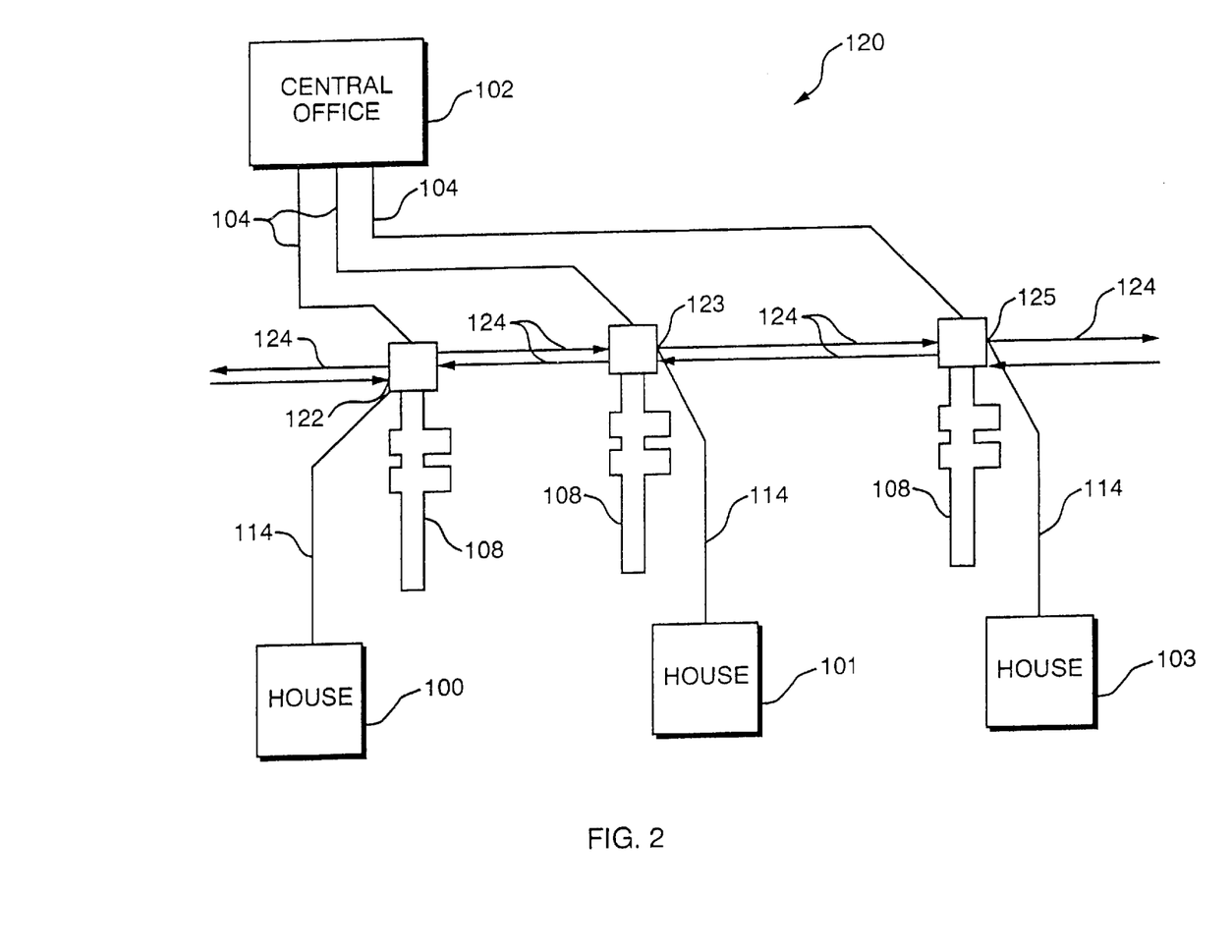
FIG. 2 depicts an embodiment of a modified wireline network according to the present disclosure.

Referring to FIG. 2, a modified telephone network 120 is depicted. The network 120 includes the central office 102, the houses 100, 101, 103, the twisted pair wires 104, the telephone poles 108 and the drop wires 114 to each house 100, 101, 103. In the network 120, a plurality of packet switch nodes 122, 123, 125 are disposed on the telephone poles 108. The packet switch nodes 122, 123, 125 are then connected to each other by connection wires 124, which might be twisted pair, coaxial, fiber optic or other wires. As a result, the individual twisted pair wires 104 from the central office 102 are networked with each other, allowing each subscriber to use 15 multiple lines, if available. For example, a user at house 101 would use drop wire 114 to connect to packet switch node 123, from which the user could connect to packet switch node 122 and packet switch node 125 (through the connection wire 124). As a result, the user could have access to three of the twisted pair wires 104, providing an increase in available bandwidth from the CO 102. Past history indicates that only 10% of the subscribers are active at any one time. Consequently, each active subscriber could obtain a significant increase in bandwidth during times that other subscribers are not active.

Figure 3:
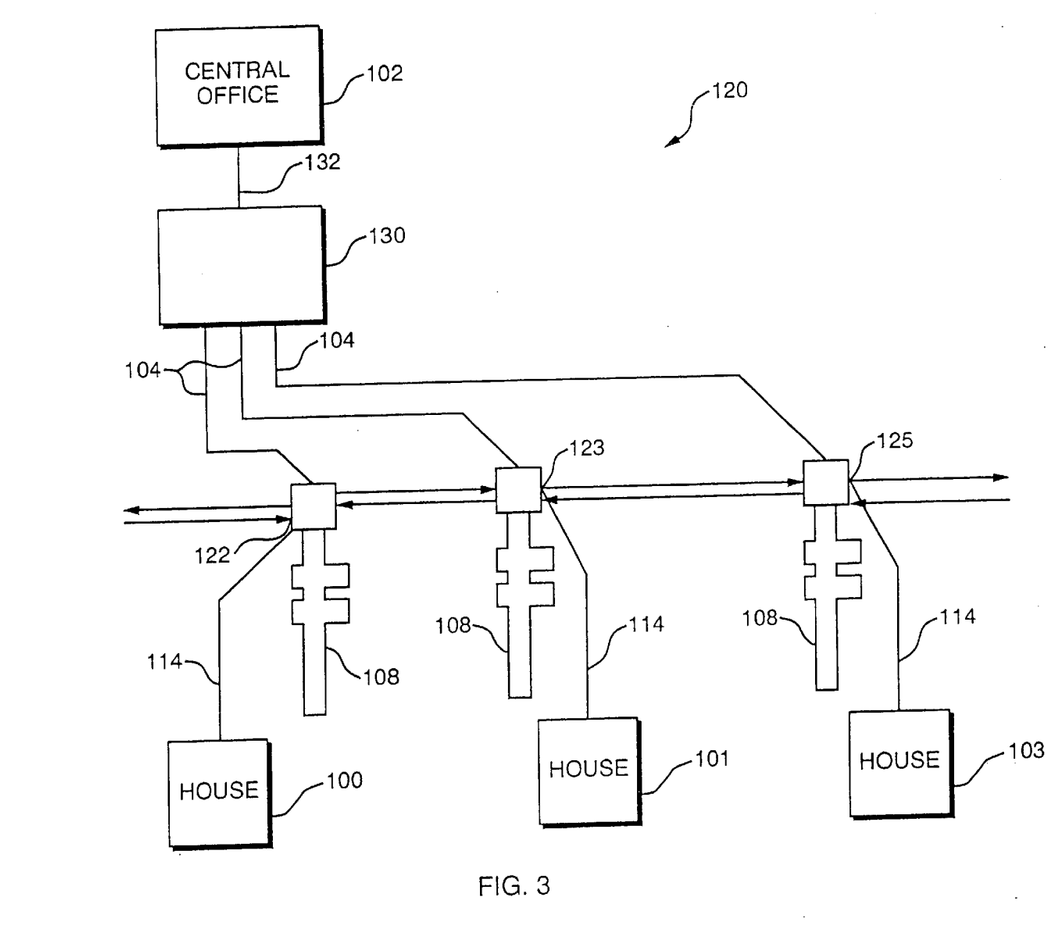
FIG. 3 depicts an alternative embodiment of a modified wireline network according to the present disclosure.

Referring to FIG. 3, in an embodiment the network 120 may also further include a neighborhood node 130, which may be connected to the central office 102 by wire, which in an embodiment may be an optical fiber 132. This embodiment may be useful for VDSL, in which the twisted pairs from the CO 102 could be replaced with the optical fiber 132 that would connect to the neighborhood node 130, which might be located at a predetermined distance, such as within three thousand feet, of the subscribers. The neighborhood node 130 may be one that is capable of converting the incoming information from the CO 102 to packets; each addressed to the subscribers located at the houses 100, 101, 103. The connection between the neighborhood node 130 and the packet switch nodes (PSN) 122, 123 and 125 would utilize ADSL/VDSL technology and ADSL/VDSL modems (avoiding the necessity of having ADSL/VDSL modems in the houses 100, 101, 103). The packet switch nodes 122, 123, 125 would recognize the packet address of a given packet and send the packet information to the appropriate house.

Referring still to FIGS. 2 and 3, the operation of an embodiment of a system and method as disclosed herein is provided. In one example, it may be assumed that the house 100 is active and that the houses 101 and 103 are inactive. (The actual number of houses served by a particular neighborhood node 130 could be much larger, at least several hundred houses with VDSL and at least thousands of houses with ADSL). The CO 102 would use twisted pair wires 104 for houses 100, 101 and 103 to send information to the house 100. The CO 102, (or the neighborhood node 130), would address all packets to the house 100. In one embodiment, a third of the packets would be sent to house 100 via packet switch node 122, another third of the packets would be sent to the house 100 by packet switch node 123 and 122, and the final third of the packets would be sent to the house 100 by packet switch node 122, 123 and 125. Thus, more twisted pair wires 104 can be employed to deliver a particular set of information to a single subscriber.

The packet switch nodes 122, 123 and 125 could be connected with conventional twisted pair wire cut in short sections sufficient to connect adjacent telephone poles 108, such as sections of one hundred feet. The relatively short sections of one hundred feet would allow communication at high speed among the packet switch nodes 122, 123 and 125. For still higher speeds the connection between the packet switch nodes 122, 123 and 125 could be replaced with a different wire, such as a coaxial cable line.

For an ADSL implementation, the neighborhood node 130 could consist of another CO 102. In such an embodiment, the number of subscribers served could be in the multiple thousands, and the distance to the subscriber could be longer, such as twelve thousand feet.

The diagrams of FIGS. 2 and 3 show downstream communication. The same wiring with appropriate electronics could provide bi-directional communication. It should also be noted that the increased bandwidth could be traded to provide longer distances for ADSL/VDSL deployment. This could be achieved by reducing the bandwidth per twisted pair wire 104 between neighborhood node 130 and the packet switch nodes 122, 123, 125.

Figure 4:
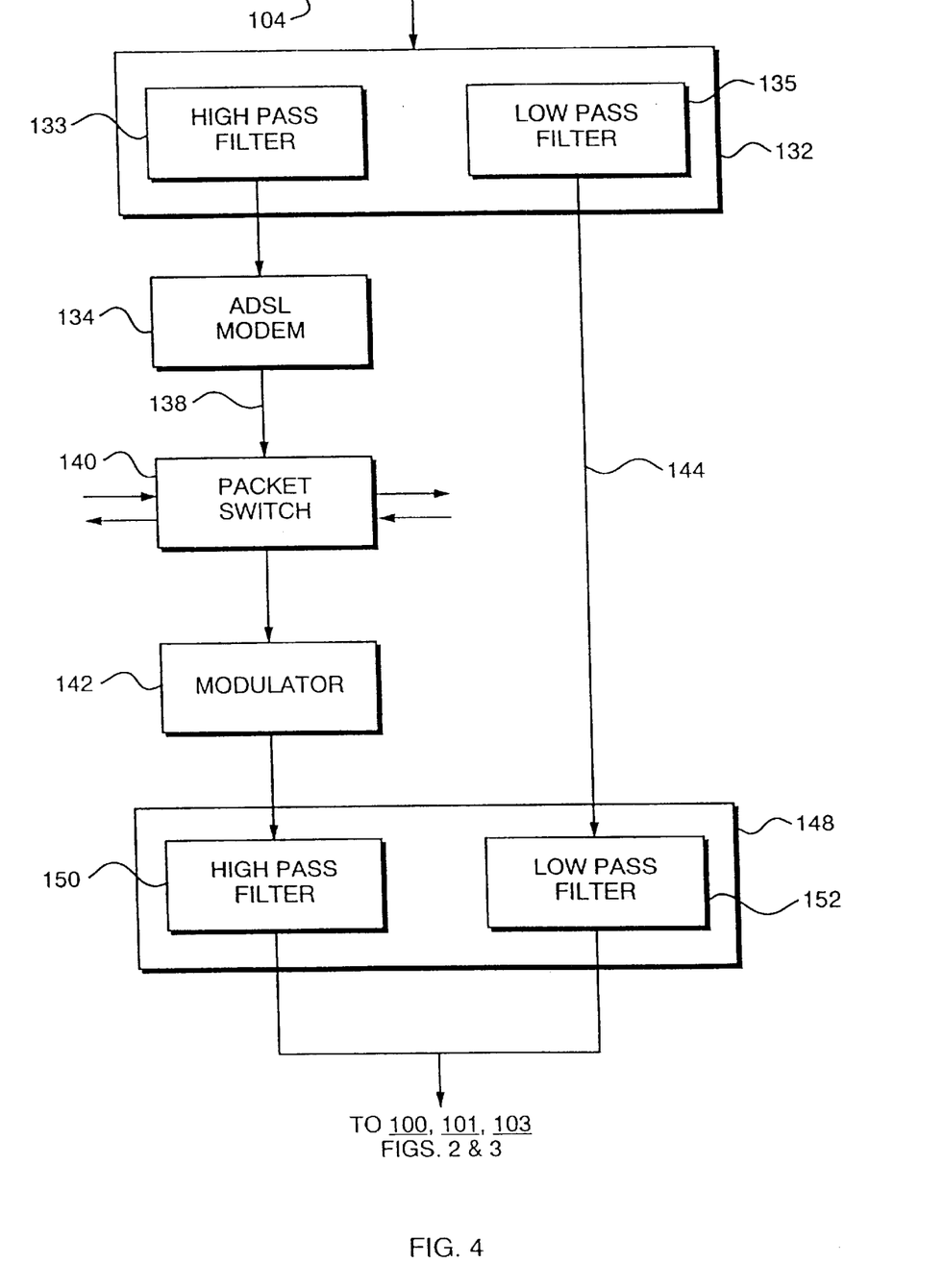
FIG. 4 depicts an embodiment of a packet switch node of the wireline network of FIG. 2 or FIG. 3.

One implementation of a packet switch node is shown in FIG. 4. The ADSL signal from the neighborhood node 130 is connected to a first splitter 132 that separates the voice data 144 from other data, such as ADSL data. The splitter may include a high pass filter 133 and a low pass filter 135. The ADSL data may then be recovered by an ADSL modem 134 whose output is a baseband digital signal 138. The digital signal 138 is input to a packet switch 140 whose output is connected to a modulator 142. The modulator 142 will shift the spectrum of the baseband digital signal 138 so that it does not overlap with voice signal 144, which may be a conventional four kHz voice signal. The voice signal 144 may then be combined with the output signal of the modulator 142 in a second splitter 148, which may include a high pass filter 150 and a low pass filter 152. The output of the second splitter 148 may be connected to the house 100, 101, 103, such as via the drop wire 114.

At the entrance of the house 100, 101, 103, the voice may be separated from the data with a splitter, and the data may be converted to baseband with a demodulator.

Figure 5:
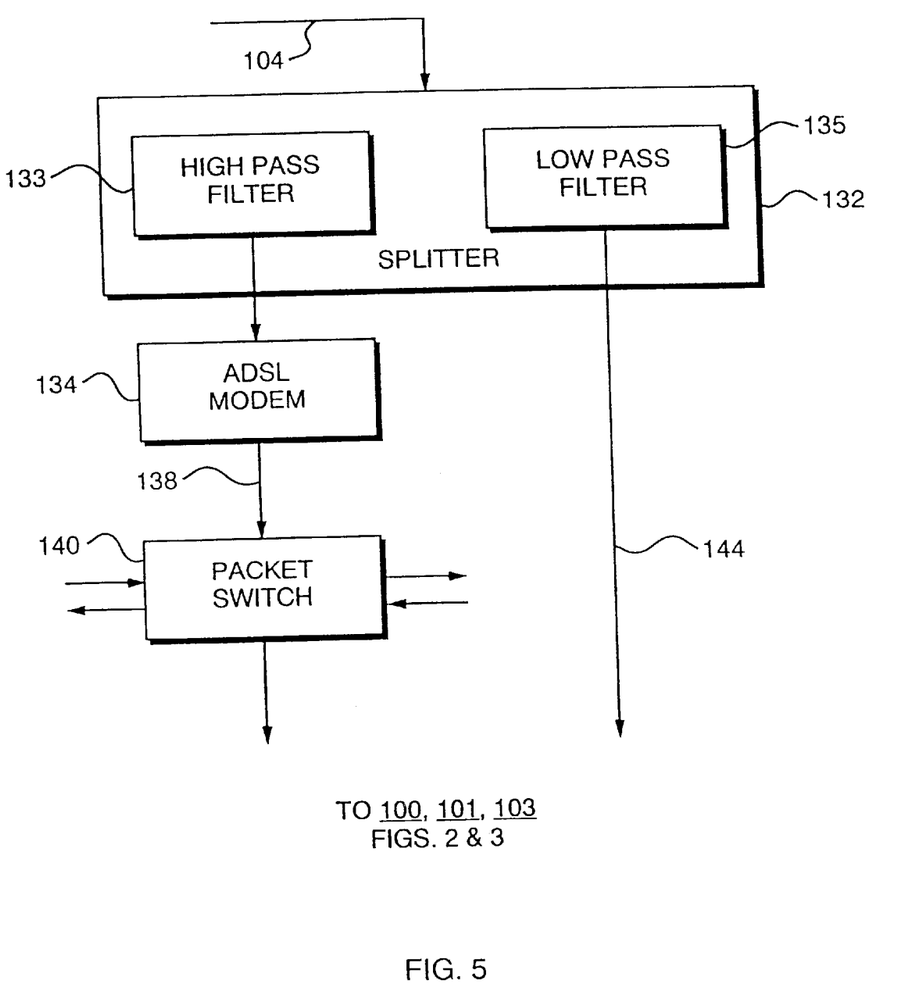
FIG. 5 depicts an alternative embodiment of a packet switch node of the wireline network of FIG. 2 or FIG. 3.

In another embodiment, as an alternative to the embodiment of FIG. 4, the modulator 142 and the second splitter 148 may be eliminated, leaving the embodiment of FIG. 5. In this arrangement, the data of the baseband digital signal 138 could be delivered to the house with a separate drop wire 114 from the drop wire 114 used for the voice signal 144. This embodiment would also eliminate the need for a splitter or demodulator in the house 100, 101, or 103. This embodiment would require the installation of a second drop wire 114 to the house.

The systems and methods described herein would provide particular benefits if a large percentage of the phone customers would subscribe to the ADSL/VDSL service, since this would allow maximum sharing of the twisted pair lines. During initial introduction of ADSL/VDSL service, a smaller percentage of customers may be expected to subscribe; thus, placing a packet switch node on each telephone pole might not be cost effective in the initial stage. A possible deployment strategy could consist of placing a PSN on the subscriber's telephone pole and on the telephone pole of the nearest neighbor. This would provide a twofold increase in bandwidth initially. As the percent of ADSL/VDSL subscribers increases, the bandwidth per subscriber will increase. An alternate strategy could be to place a PSN on the subscriber's telephone pole only. In this case there would be no increase in bandwidth initially. This deployment strategy might still be consistent with subscriber's requirements, given that the demand for bandwidth is expected to increase with time.

In addition to increasing the bandwidth due to sharing of twisted pairs, the existing bandwidth can be utilized more efficiently. For example, when multiple subscribers request the same TV program, it need only to be sent once via a multi-cast to multiple subscribers. In particular, the transmission can include packets that identify the addresses of multiple households for receipt of the transmission, and the packet switch nodes 122, 123 and 125 can address the transmission to each house 100, 101, 103 that has ordered the transmission.

While certain embodiments of the invention are depicted herein, it should be understood that other embodiments would be understood to one of ordinary skill in the art and that such embodiments are encompassed herein.

What is claimed is:

1. A method for sending and receiving broadband data over twisted pair wire lines between a central office and a remote subscriber, comprising:
   providing twisted pair wire lines from a remote location to a location proximal to a subscriber;
   providing a plurality of packet switch nodes at the location proximal to the subscriber; and
   networking the packet switch nodes with the twisted pair wire lines from the remote location, to permit the packet switch nodes to communicate directly with one another.

2. A method of claim 1, wherein the packet switch node is capable of identifying packets addressed to a particular subscriber and sending packets to the particular subscriber.

3. A method of claim 2, wherein each of the packet switch nodes includes a modem.

4. A method of claim 3, wherein the modem is an ADSL modem.

5. A method of claim 3, wherein the modem is a VDSL modem.

6. A method of claim 2, wherein the packet switch node includes a splitter that separates voice data from other data.

7. A method of claim 2, wherein the packet switch node includes a packet switch for directing a communication to a particular subscriber.

8. A method of claim 2, wherein each packet switch node further comprises a first splitter for separating voice data from other data, an ADSL modem, a packet switch, a modulator, and a second splitter.

9. A method for sending and receiving broadband data over twisted pair wire lines between a central office and a remote subscriber, comprising:
   providing a telecommunications line from a central office;
   providing twisted pair wire lines from a remote location to a location proximal to a subscriber;
   providing a neighborhood node at the remote location and connected between the telecommunications line from the central office and the twisted pair lines;
   providing a plurality of packet switch nodes at the location proximal to the subscriber; and
   networking the packet switch nodes with the twisted pair wire lines from the remote location, to permit the packet switch nodes to communicate directly with one another.

10. A method of claim 9, wherein the neighborhood node is capable of converting incoming information from the central office into packets and capable of addressing each packet to a selected subscriber.

11. A method of claim 10, wherein the packet switch node is capable of identifying packets addressed to a particular subscriber and sending packets to the particular subscriber.

12. A method of claim 10, wherein the modem is a VDSL modem.

13. A method of claim 10, wherein each packet switch node further comprises a first splitter for separating voice data from other data, an ADSL modem, a packet switch, a modulator, and a second splitter.

14. A network for sending and receiving broadband data, comprising:
   a plurality of twisted pair lines between a central office and a remote subscriber; and
   a plurality of packet switch nodes, each being proximal to a remote subscriber for identifying packets addressed to a particular subscriber and for sending packets to the particular subscriber;
   wherein the packet switch nodes are coupled to one another by at least one of twisted pair lines and a coaxial cable to permit the packet switch nodes to communicate directly with one another.

15. A network of claim 14, wherein, each of the packet switch nodes has a modem that is at least one of an ADSL modem and a VDSL modem.

16. A network of claim 14, wherein each packet switch nodes includes a modem, a first splitter that separates voice data from other data, the first splitter providing the other data to the modem for recovery, a modulator for shifting the spectrum of the other data so that it does not overlap with the voice data, and a second splitter for splitting voice data from other data.

17. A network of claim 14, further comprising:
   a neighborhood node between the central office and the subscriber, the neighborhood node located within a predetermined distance of the subscriber, the neighborhood node capable of converting incoming information from the central office into packets and capable of addressing each packet to a selected subscriber.

18. A network of claim 17, further comprising:
   a network connection between the neighborhood node and the packet switch node, the network connection using at least one of ADSL and VDSL technology for transmission of data packets.

19. A network of claim 17, further comprising:
   a connection between the neighborhood node and the central office, wherein the connection is an optical fiber.

20. A network, comprising:
   a plurality of twisted pair lines between a central office and a remote subscriber;
   a plurality of packet switch nodes proximal to the subscriber for identifying packets addressed to a particular subscriber and for sending packets to the particular subscriber, each of the packet switch nodes having a splitter for separating voice data from other data;
   a network connection between the neighborhood node and the packet switch node, the network connection using at least one of ADSL and VDSL technology for transmission of data packets; and
   a connection between the packet switch nodes, to permit the packet switch nodes to communicate directly with one another.

21. A network of claim 19, further comprising:
   a neighborhood node between the central office and the subscriber capable of converting incoming information from the central office into packets and capable of addressing each packet to a selected subscriber.

22. A network, comprising:
a plurality of twisted pair lines;
a neighborhood node between the central office and a subscriber capable of converting incoming information from the central office into packets and capable of addressing each packet to a selected subscriber;
a plurality of packet switch nodes proximal to the subscriber for identifying packets addressed to a particular subscriber and for sending packets to the particular subscriber, each of the packet switch nodes having a splitter for separating voice data from other data;
a network connection between the neighborhood node and the packet switch node, the network connection using at least one of ADSL and VDSL technology for transmission of data packets; and
a connection between the packet switch node, to permit the packet switch nodes to communicate directly with one another.

23. A network of claim 22, wherein the packet switch nodes are connected by coaxial cable.

24. A network, comprising:
a plurality of twisted pair lines between a central office and a remote subscriber;
means for addressing packets to a particular remote subscriber;
means for identifying data packets addressed to a particular subscriber and for sending packets to the particular subscriber; and
means for connecting the means for identifying data packets, to permit the means for identifying data packets to communicate directly with one another.

25. In a telephone network having a plurality of subscriber terminals connected to a central office via twisted pair lines, at least one packet switch node connected between the subscriber terminals and the central office, the at least one packet switch node comprising:
a first splitter that separates voice signals from data signals in call signals received from the central office over the twisted pair lines;
a modulator that shifts a spectrum of the data signals; and
a second splitter that combines the shifted data signals with the voice signals and transmits the combined signals to the subscriber terminals.

26. The packet switch node of claim 25, further comprising:
a modem that recovers the data signals from the first splitter and outputs the recovered data signals to the modulator.

27. The packet switch node of claim 25, wherein each of the first and second splitters includes:
a high pass filter that separates the data signals, and
a low pass filter that separates the voice signals.

28. The packet switch node of claim 25, wherein the at least one packet switch node includes a plurality of packet switch nodes.

29. The packet switch node of claim 28, wherein each of the packet switch nodes includes:
a switch connected to at least one other packet switch node to transmit call signals between the packet switch nodes.

30. In a telephone network having a plurality of subscriber terminals connected to a central office via twisted pair lines and a plurality of packet switch nodes, a method for routing call information by one of the packet switch nodes comprising:
receiving the call information from the central office over one of the twisted pair lines;
separating voice signals from data signals in the received call information;
shifting a spectrum of the data signals;
combining the shifted data signals with the voice signals; and
transmitting the combined signals to one of the subscriber terminals.

31. The method of claim 30, further comprising:
recovering the data signals after separating the data signals.

32. The method of claim 30, further comprising:
sending the received call information to another one of the packet switch nodes for routing to the one subscriber terminal.

33. In a telephone network having a plurality of subscriber terminals connected to a central office via twisted pair lines, at least one packet switch node connected between the subscriber terminals and the central office, the at least one packet switch node comprising:
means for extracting voice signals from call signals received from the central office over the twisted pair lines;
means for recovering data signals from the received call signals;
means for shifting a spectrum of the data signals;
means for combining the shifted data signals with the voice signals; and
means for transmitting the combined signals to the subscriber terminals.

34. In a telephone network having a plurality of subscriber terminals connected to a central office via twisted pair lines, a plurality of packet switch nodes proximal to the subscriber terminals and being connected between the subscriber terminals and the central office, each of the packet switch nodes comprising:
a splitter that extracts voice signals from call signals received from the central office over the twisted pair lines;
a modem that recovers data signals from the received call signals and transmits the recovered data to the subscriber terminals; and
a switch connected to at least one other packet switch node to transmit certain ones of the received call signals to the at least one other packet switch node for routing the call signals to the subscriber terminals.

35. A telephone network comprising:
a central office;
a plurality of packet switch nodes that receive call signals from the central office, each of the packet switch nodes being proximal to a subscriber terminal and being connected to the central office via twisted pair wires and to at least one other packet switch node to permit the packet switch nodes to communicate directly with one another, each packet switch node including
a splitter that extracts voice signals from the call signals,
a modem that recovers data signals from the call signals and transmits the recovered data to subscriber terminals, and
a switch that connects to the at least one other packet switch node to transmit certain ones of the call signals.

36. The telephone network of claim 35, further comprising:

a neighborhood node, connected to the central office and the packet switch nodes, that converts the call signals from the central office to packets and transmits the packets to the packet switch nodes.

* * * * *